(12) United States Patent
Williams et al.

(10) Patent No.: US 9,216,368 B1
(45) Date of Patent: Dec. 22, 2015

(54) APPARATUS FOR FILTERING AND/OR PURIFYING WATER OF A POTABLE WATER DISTRIBUTION SYSTEM, SUCH AS A POTABLE WATER DISTRIBUTION SYSTEM FOR AIRCRAFT, SAID APPARATUS PROVIDING WATER BOILER EXPANSION PRESSURE RELIEF

(75) Inventors: Richard T. Williams, Glenmoore, PA (US); Carl Beiswenger, Pottstown, PA (US)

(73) Assignee: GENERAL ECOLOGY, INC., Exton, PA (US)

( * ) Notice: Subject to any disclaimer, the term of this patent is extended or adjusted under 35 U.S.C. 154(b) by 405 days.

(21) Appl. No.: 13/618,943

(22) Filed: Sep. 14, 2012

(51) Int. Cl.
*B01D 27/10* (2006.01)
*B01D 35/153* (2006.01)
*B01D 35/147* (2006.01)

(52) U.S. Cl.
CPC ............ *B01D 27/103* (2013.01); *B01D 27/106* (2013.01); *B01D 35/1475* (2013.01); *B01D 35/153* (2013.01); *B01D 2201/291* (2013.01)

(58) Field of Classification Search
None
See application file for complete search history.

(56) References Cited

U.S. PATENT DOCUMENTS

| 3,369,666 | A | * | 2/1968 | Hultgren et al. | 210/130 |
| 4,444,247 | A | * | 4/1984 | Franck et al. | 165/119 |
| 8,671,980 | B2 | * | 3/2014 | Williams et al. | 137/614.02 |

* cited by examiner

*Primary Examiner* — Terry Cecil
(74) *Attorney, Agent, or Firm* — John F. A. Earley, III; Frank J. Bonini, Jr.; Harding, Earley, Follmer & Frailey, P.C.

(57) ABSTRACT

An apparatus for filtering and/or purifying water flowing through a water distribution system has a water filtration/purification cartridge mounted inside a housing. The apparatus provides for water boiler expansion pressure relief, while guarding against any water contaminated downstream of the apparatus backflowing into contact with the outlet side of the filtering and/or purifying matrix of the cartridge to prevent possible contamination of the outlet side of the matrix from such backflow and thereby cause water exiting the outlet port apparatus to be contaminated.

10 Claims, 6 Drawing Sheets

APPARATUS FOR FILTERING AND/OR PURIFYING WATER OF A POTABLE WATER DISTRIBUTION SYSTEM, SUCH AS A POTABLE WATER DISTRIBUTION SYSTEM FOR AIRCRAFT, SAID APPARATUS PROVIDING WATER BOILER EXPANSION PRESSURE RELIEF

FIELD OF THE INVENTION

This invention relates to potable water distribution systems, such as potable water distribution systems for aircraft, and more particularly concerns apparatuses positioned along potable water distribution systems for filtering and/or purifying water of the potable water distribution systems.

BACKGROUND OF THE INVENTION

Adequate hydration is particularly important for comfortable air travel, especially aboard modern, very large, long range aircraft capable of flights of 20 or more hours duration. Typically, water is distributed to galleys, lavatories, and drinking water outlets of the aircraft to provide drinking water to passengers, to provide water for food and beverage preparation, and to provide water for personal hygiene (e.g., face and hand rinsing, teeth cleaning, etc.) during flights. Aircraft typically are crowded with thousands of passengers including babies, small children, handicapped people, possibly ill people, and others, from varied backgrounds, passing through a commercial passenger aircraft during a single week. Both passengers and crews contribute to microorganism populations aboard aircraft, and special precautions must be taken to minimize and avoid the possibility of bacteria, viruses, pathogenic cysts, and other microorganisms being transferred among passengers through the water distribution system. Further, water is supplied to aircraft from many locations and varies widely in taste and sanitary quality. In addition to point-of-use effective on-board drinking water microfilters/purifiers, a primary sanitation defense mechanism against bacteria and viruses is to maintain an adequate residual of chlorine, preferably free chlorine, within the water storage and distribution systems. Further, effective on-board point-of-use drinking water microfilters/purifiers reliably remove parasitic cysts (leading causes of water borne disease worldwide) such as Giradia and Crypto which are not controlled by chlorination.

Typically, a water distribution system on aircraft comprises a water storage tank supplying a centralized distribution line with various branches or legs extending from the central distribution line to locations throughout the aircraft. For example, water is distributed via the water distribution system to galleys, lavatories, and other locations as needed for food and beverage preparation, and for personal hygiene during flights. Galleys include many "service points" such as coffee makers, water boilers, and drinking water outlets. Similarly, lavatories often include drinking water outlets and may be used for face and hand rinsing, cleaning teeth and short term personal medication. There are many possible opportunities for aircraft drinking water systems/supplies to become contaminated with microorganisms even if hygienically safe when loaded aboard an aircraft.

Typically, water filter/purifier units (e.g., a water filter or a water purifier), each comprising a housing (e.g., a pressure vessel) and a filtration/purification cartridge contained in the housing for filtering and/or purifying water, are installed in or near galleys and lavatories on water lines of the water distribution system as part of the aircraft water distribution system to filter and/or purify the water passing through the water filter/purifier units to improve water quality for consumption and for food and beverage preparation. Water purifiers (water filter/purifiers having a purification element) must be independently certified to meet the EPA Guide Standard Protocol for Microbiological Purifiers relative to bacteria, viruses and cysts. Structured Matrix™ purifiers, sold by General Ecology, Inc., also provide excellent filtration. Filters, such as General Ecology, Inc.'s Structured Matrix™ microfilters or simple, fine, or coarse carbon and/or sediment systems, may be sophisticated, but such filters cannot legally be referred to as microbiological purifiers before being verified that they meet the EPA Guide Standard Protocol for Microbiological Purifiers. Space in galley and lavatory compartments is expensive and severely limited. Accordingly, water filter/purifier units usually are installed in "out of the way", often difficult to access locations often behind other more readily accessible equipment and bulkheads.

Possible microorganisms of concern are pathogenic bacteria, cysts and viruses. Chlorine resistant pathogenic cysts such as Crypto require special consideration and protective measures, such as providing point-of-use water filter/purifier units (e.g., water purifiers along the aircraft water distribution system to remove pathogenic cysts from the water moving through them). Such water filter/purifier units also remove bacteria, viruses, and other microorganisms from the water moving through them. Further, to overcome the challenges of virus and bacteria transmission via water systems and colonization within the aircraft potable water distribution systems, airlines often try to assure an adequate chlorine residual within the aircraft water supply. Even so, it is necessary to periodically "sanitize" the aircraft water distribution system, typically with a 2+ hours soak of high concentration (100 ppm) chlorine solutions. The sanitation process requires time and labor intensive removal of filtration/purification cartridges from the water filter/purifier units installed along the water lines of the water distribution system in galleys, fountains, and lavatories throughout the aircraft prior to the sanitation process. After removal of cartridges, pressure vessels must be reassembled to allow complete distribution of the sanitizing solution through the water distribution system and to prevent leakage of this highly corrosive and oxidizing sanitizing solution during the two hours sanitization soak.

Filtration/purification cartridge removal is required for at least two reasons: 1) because a high concentration of chlorine is detrimental to most filtration/purification cartridges, and 2) more importantly, because microorganisms might be sheltered in crevices and imperfections at sealing surface interfaces (ideal locations for biofilm formation) of the water filter/purifier units compromising effectiveness of the sanitizing process, thereby allowing recolonization of the distribution system. Even though sanitization is recognized as effective, typically because of the relatively high cost of the sanitizing process and the revenue lost due to the downtime of the aircraft during the sanitizing process, sanitization is performed infrequently—possibly every six months or at a convenient "A Check" or more extensive maintenance intervals when other maintenance is carried out.

After chlorine flushing and soaking for two hours, following current practices, the pressure vessels once again are opened and the same filtration/purification cartridges (or new replacement filtration/purification cartridges) are installed. Potable water is flushed throughout the aircraft water distribution system to thoroughly remove the extremely high concentration sanitizing solutions. Several hours may be required to sanitize an aircraft resulting in costs averaging upwards to hundreds of dollars per unit.

Even with periodic sanitization, bacteria may colonize various branches (legs)(water lines) of water distribution systems. Bacteria multiply rapidly, sometimes doubling in number in approximately 16 minutes. Therefore, a small number of bacteria may quickly reach infectious concentrations in water intended to be consumed, especially downstream of improperly installed/serviced water filter/purifier units employed to remove chlorine, foul tastes, and odors. Further, water filter/purifier units installed in semi-remote locations along water lines of the water distribution system often require longer than desired water distribution lines (water lines) to specific service points (e.g., locations where the water is discharged from the water distribution system). These distribution lines provide unnecessary opportunities for previously purified water to be recontaminated from inadvertent inoculation, short term bacteria multiplication or biofilm formation/shedding that may have taken place in such distribution lines downstream of the water filter/purifier units. Accordingly, it is important to provide protection against water that has been contaminated downstream of a water filter/purifier unit backflowing from downstream of a water filter/purifier unit back into the water filter/purifier unit and contaminating the portion of the filtration/purification medium (e.g., a filtration/purification cartridge) of a water filter/purifier unit thereby causing water exiting the outlet port of the filter/purifier unit to be contaminated, which would create a health risk to passengers from bacteria, viruses, and the like being transferred from contaminated water from the water distribution system.

Water boilers are typically provided along the water distribution lines of a potable water distribution system for aircraft, and are provided typically along the water distribution lines downstream of water filter/purifier units of the potable water distribution system typically at or near galleys to provide hot water for use preparing beverages like coffee and tea. If water boiler expansion pressure builds up to a dangerous level due to a water boiler overheating, and protection against backflow of water through the water filter/purifier units is provided, the water boiler expansion pressure created by the water boiler overheating creates a risk of extremely hot water blowing back along the water distribution lines between the water boiler and a water filter/purifier unit, with the pressure being released by opening a faucet, such as a cold water faucet, positioned along the water distribution lines between the water boiler and the water filter/purifier unit upstream of the water boiler, possibly resulting in the person that opened the faucet being injured by scalding hot water.

Removing the backflow protection to provide some water boiler expansion pressure relief in the potable water distribution system creates a risk that the structure of the filtration/purification medium (e.g., a filtration/purification cartridge) of a water filter/purifier unit may be damaged if exposed to such water boiler expansion pressure. Moreover, removing the backflow protection creates a risk that water contaminated downstream of the water filter/purifier unit may backflow into the water filter/purifier unit and contaminate the portion of the water filter/purifier unit downstream of the filtration/purification medium of the water filter/purifier unit, thereby causing water exiting the outlet port of the water filter/purifier unit to be contaminated, which would create a health risk to passengers from bacteria, viruses, and the like being transferred from contaminated water from the water distribution system.

SUMMARY OF THE INVENTION

It is an object of the invention to provide an apparatus (also referred to as a water filter/purifier unit or a water filtration/purification canister) for filtering and/or purifying water of a water distribution system, such as a potable water distribution system for aircraft, that comprises a housing and a filtration/purification cartridge contained in the housing for filtering and/or purifying water, and that provides for water boiler expansion pressure relief by permitting the water boiler expansion pressure to be directed backwards along the water distribution lines of the water distribution system and back towards the water supply source (e.g., a water supply tank) of the water distribution system, while guarding against any water contaminated from biofilm, bacteria, viruses, pathogenic cysts, and other microorganisms downstream of the apparatus from backflowing into the apparatus and contaminating the portion of the apparatus downstream of the medium held in the housing for filtering and/or purifying water and thereby causing the water exiting the outlet port of the apparatus to be contaminated.

This object, as well as other objects, are provided by our invention, a description of which is set out below.

DETAILED DESCRIPTION OF THE DRAWINGS

Figure 1:
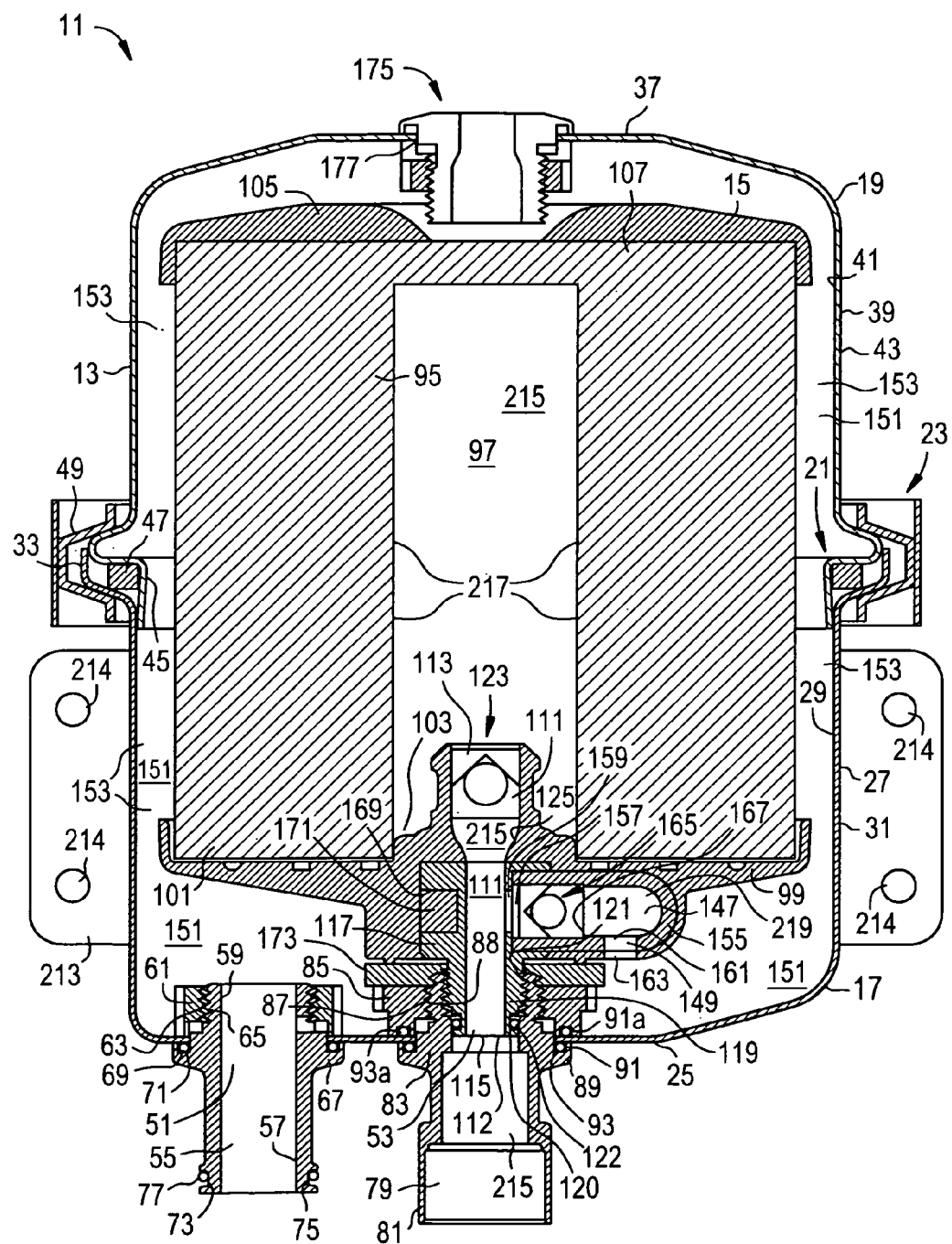
FIG. 1 is a view in cross-section of an apparatus, constructed in accordance with the invention, for filtering and/or purifying water flowing through a water distribution system.
Figure 2:
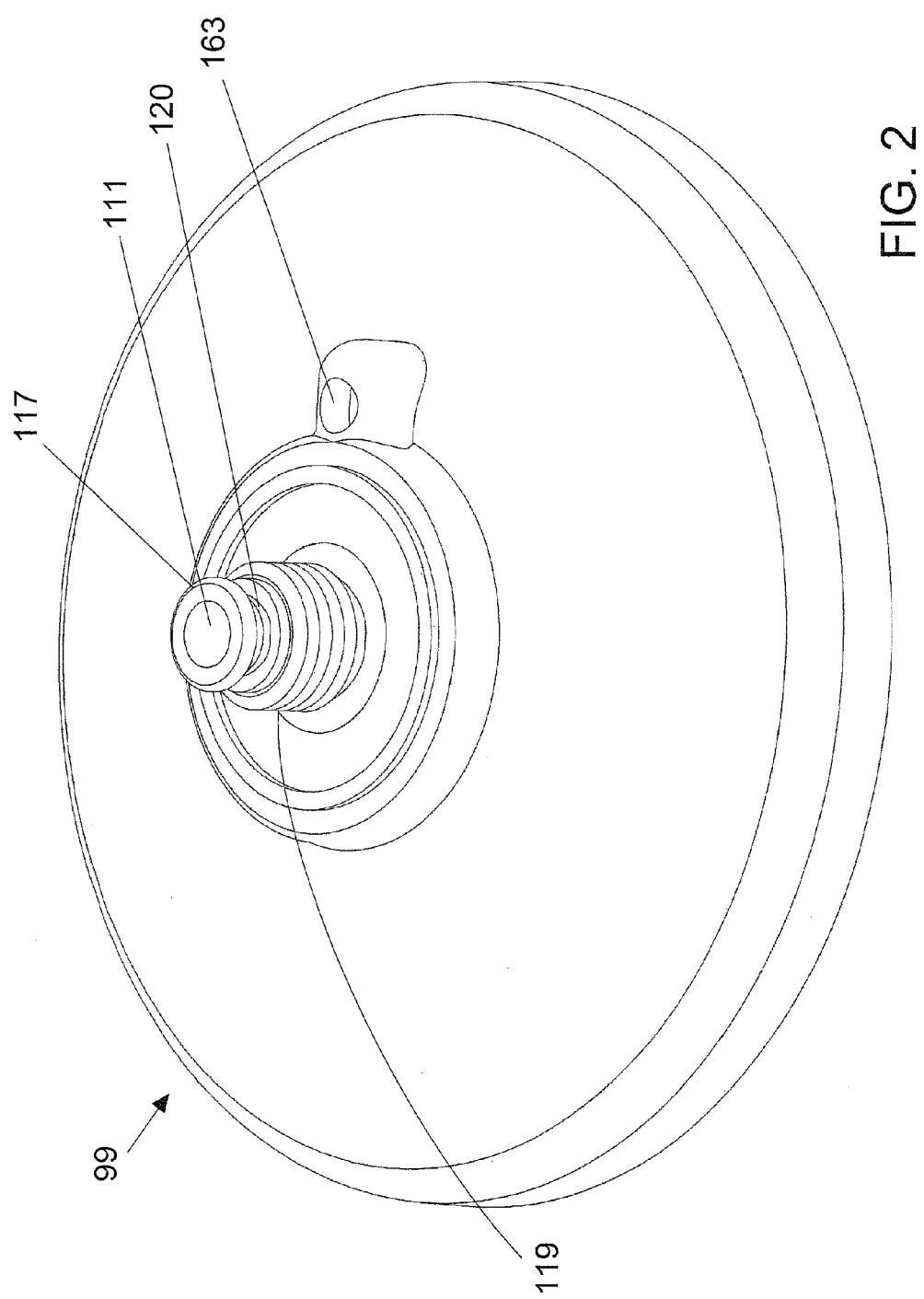
FIG. 2 is a view in perspective of the inventive first end cap, showing the top thereof.
Figure 3:
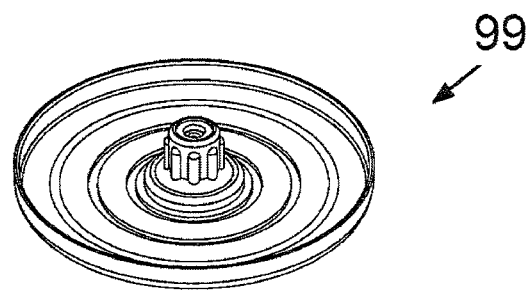
FIG. 3 is a view in perspective of the inventive first end cap showing the bottom thereof.
Figure 4:
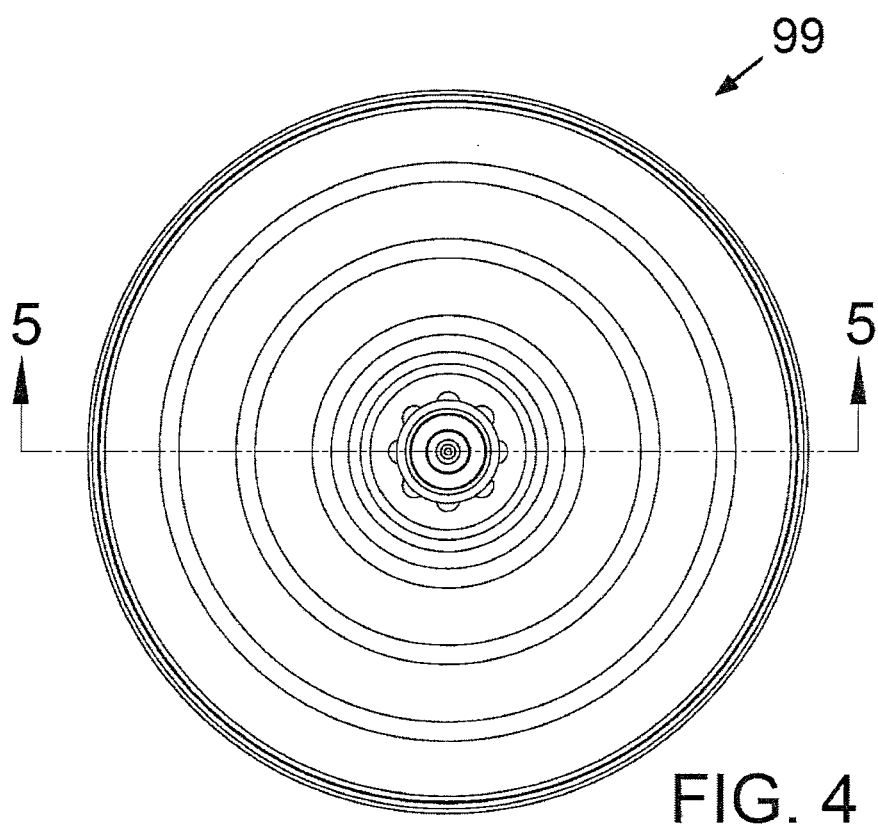
FIG. 4 is a bottom plan view of the inventive first end cap shown in FIGS. 3 and 4.

Turning now to the drawings, there is shown in FIG. 1 an apparatus 11 for filtering and/or purifying water flowing through a potable water distribution system, such as a potable water distribution system for aircraft. Preferably, the apparatus 11 is positioned along a water line of the potable water distribution system in aircraft in lavatories to provide filtered and/or purified water for personal hygiene during flights and at or near galleys for food and beverage preparation.

Apparatus 11 includes a housing (e.g., a pressure vessel) 13 and a cartridge 15 positioned in the housing 13 for filtering and/or purifying water passing through the cartridge.

Preferably, as shown in FIG. 1, the housing 13 comprises a cover 17, a bowl 19 positioned above the cover in the view of the apparatus 11 shown in FIG. 1, sealing means 21 for sealing between the cover 17 and the bowl 19, and securing means 23 for securing the cover 17 to the bowl 19.

The cover 17 has a top wall 25 and a side wall 27 extending vertically away from the top wall 25. The side wall 27 of the cover 17 has an inner surface 29, an outer surface 31, and a rim portion 33.

The bowl 19 has a bottom wall 37 and a side wall 39 extending vertically away from the bottom wall 37. The side wall 39 of the bowl 19 has an inner surface 41, an outer surface 43, and a rim portion 45.

Sealing means 21 comprises an annular gasket 47 positioned against and providing a seal between the inner surface 29 of the side wall 27 of the cover 17 at the rim portion 33 of the side wall 27 and the outer surface 43 of the side wall 39 of the bowl 19 at the rim portion 45 of the side wall 39 of the bowl 19, when the rim portion 33 of the cover 17 is secured to the rim portion 45 of the bowl 19 compressing the gasket 47 between the inner surface 29 of the side wall 27 of the cover 17 at the rim portion 33 of the side wall 27 of the cover 17 and the outer surface 43 of the side wall 39 of the bowl 19 at the rim portion 45 of the side wall 39 of the bowl 19. Preferably, the gasket 47 has a substantially rectangular or substantially circular cross-section.

Securing means 23 comprises an annular clamp 49 positioned around the rim portion 33 of the cover 17 and the rim portion 45 of the bowl 19 to hold the cover 17 to the bowl 19 when the clamp 49 is clamped in place.

The top wall 25 of the cover 17 has a first opening 51 and a second opening 53. As shown in FIG. 1, the apparatus 11 is provided with an inlet port 55 to the interior of the housing 13. The inlet port 55 comprises a hollow cylinder-shaped inlet port member 57 that is removably mounted on the top wall 25 of the cover 17 by inserting the second end portion 59 of the inlet port member 57 through the first opening 51 in the top wall 25 of the cover 17 and into engagement with a first nut 61 positioned inside the housing 13 and having threading 63 matched to receive threading 65 formed on the second end portion 59 of the inlet port member 57. The inlet port member 57 has a flange 67 formed thereon that has an annular groove 69 formed therein, and an o-ring 71 is positioned in the groove 69 such that a portion of the o-ring 71 projects from the groove 69 into contact with the portion of the top wall 25 of the cover 17 surrounding the first opening 51 when the inlet port member 57 is mounted on the top wall 25 of the cover 17 to seal between the inlet port member 57 and the top wall 25 of the cover 17. When the first nut 61 is threaded onto the threaded second end portion 59, the flange 67 of the inlet port member 57 sandwiches the o-ring 71 and the portion of the top wall 25 surrounding the first opening 51 therebetween to mount the inlet port member 57 onto the top wall 25 of the cover 17 and to form a seal between the inlet port member 57 and the top wall 25 of the cover 17. A groove 73 also is formed around the inlet port member 57 at the first end portion 75 of the inlet port member 57 that receives an o-ring 77 for sealing between the inlet port member 57 and a water transmission line of the water distribution system when the water transmission line is connected to and in fluid communication with inlet port member 57 for transmitting water to be filtered and/or purified into the apparatus 11.

Also as shown in FIG. 1, the apparatus 11 is provided with an outlet port 79 to the interior of the housing 13. The outlet port 79 comprises a hollow cylinder-shaped outlet port member 81 that is removably mounted on the top wall 25 of the cover 17 by inserting the second end portion 83 of the inlet port member 81 through the second opening 53 in the top wall 25 of the cover 17 and into engagement with a second nut 85 positioned inside the housing 13 and having threading 87 matched to receive threading 88 formed on the second end portion 83 of the outlet port member 81. The outlet port member 81 has a flange 89 formed thereon that has an annular groove 91 formed therein, and an o-ring 93 is positioned in the groove 91 such that a portion of the o-ring 93 projects from the groove 91 into contact with the portion of the top wall 25 of the cover 17 surrounding the second opening 53 when the outlet port member 81 is mounted on the top wall 25 of the cover 17 to seal between the outlet port member 81 and the top wall 25 of the cover 17. When the second nut 85 is threaded onto the threaded second end portion 83, the flange 89 of the outlet port member 81 sandwiches the o-ring 93 and the portion of the top wall 25 surrounding the second opening 53 therebetween to mount the outlet port member 81 onto the top wall 25 of the cover 17 and to form a seal between the outlet port member 81 and the top wall 25 of the cover 17. An annular groove 91a is formed in the first portion of the second nut 85 that receives an o-ring 93a for sealing between the second nut 85 and the top wall 25 of the cover 17 when the second nut 85 has been threaded onto the threaded second end portion 83 of the outlet port member 81.

As shown in FIG. 1, the cartridge 15 preferably comprises a cylindrical microfiltration matrix 95 for filtering and/or purifying water passing through it. The matrix 95 has a cylindrical channel 97 along the center axis of the matrix 95 that receives water after it has passed through the matrix 95. The cartridge 15 includes a first end cap 99, which is secured onto the first end 101 of the matrix 95 and extends over the first end 103 of the cylindrical channel 97, and a second end cap 105, which preferably is made from a polymeric material and is secured onto the second end 107 of the matrix 95.

The first end cap 99 has a first passageway 111 extending through the first end cap 99, and the first passageway 111 of the first end cap 99 has a first end portion 113 and a second end portion 115. An outlet port 112 is formed at the second end portion 115 of the first passageway 111 that is adapted to be connected to and be in fluid communication with the outlet port 79. As shown in FIG. 1, the first end cap 99 includes a hollow tube or stem member 117, which preferably is made from stainless steel, and which includes a portion of first passageway 111 extending through it. The tube 117 has a threaded end portion 119 formed on its exterior surface and a groove 120 (which receives an o-ring 122), and the cartridge 15 is attached to the outlet port 79 by screwing the threaded end portion 119 into the second end portion 83 of the outlet port member 81, the threaded end portion 119 engaging matching female threading 121 formed in the second end portion 83 of the outlet port member 81.

Figure 5:
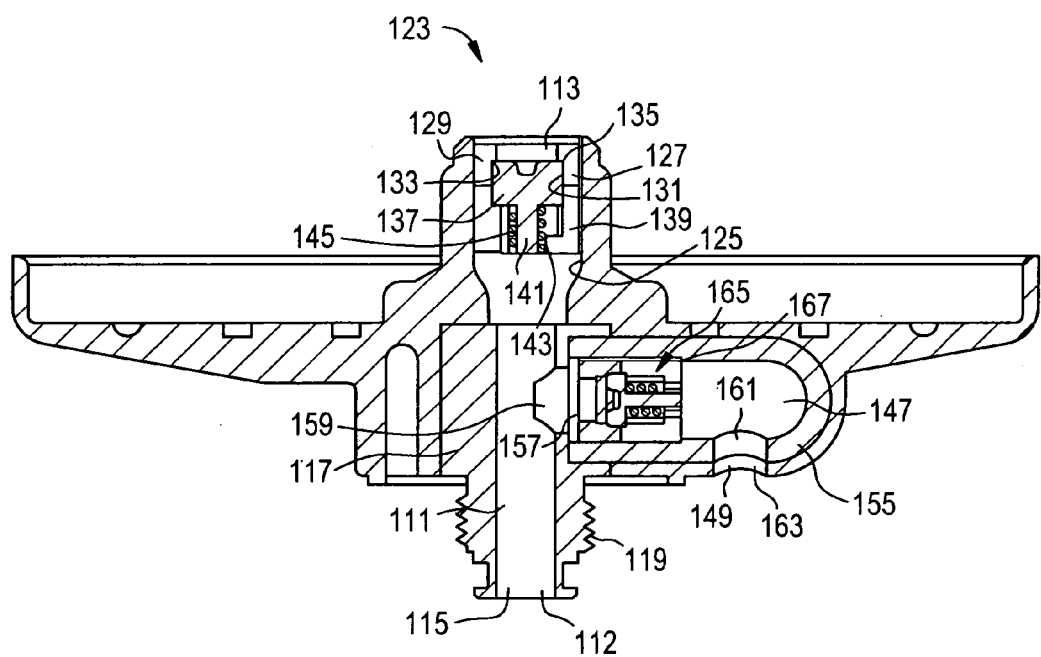
FIG. 5 is a view in cross-section taken along the lines and arrows 5-5 shown in FIG. 4 showing in detail the specifics of the invention first end cap of the cartridge and the first and second valves mounted therein.
Figure 6:
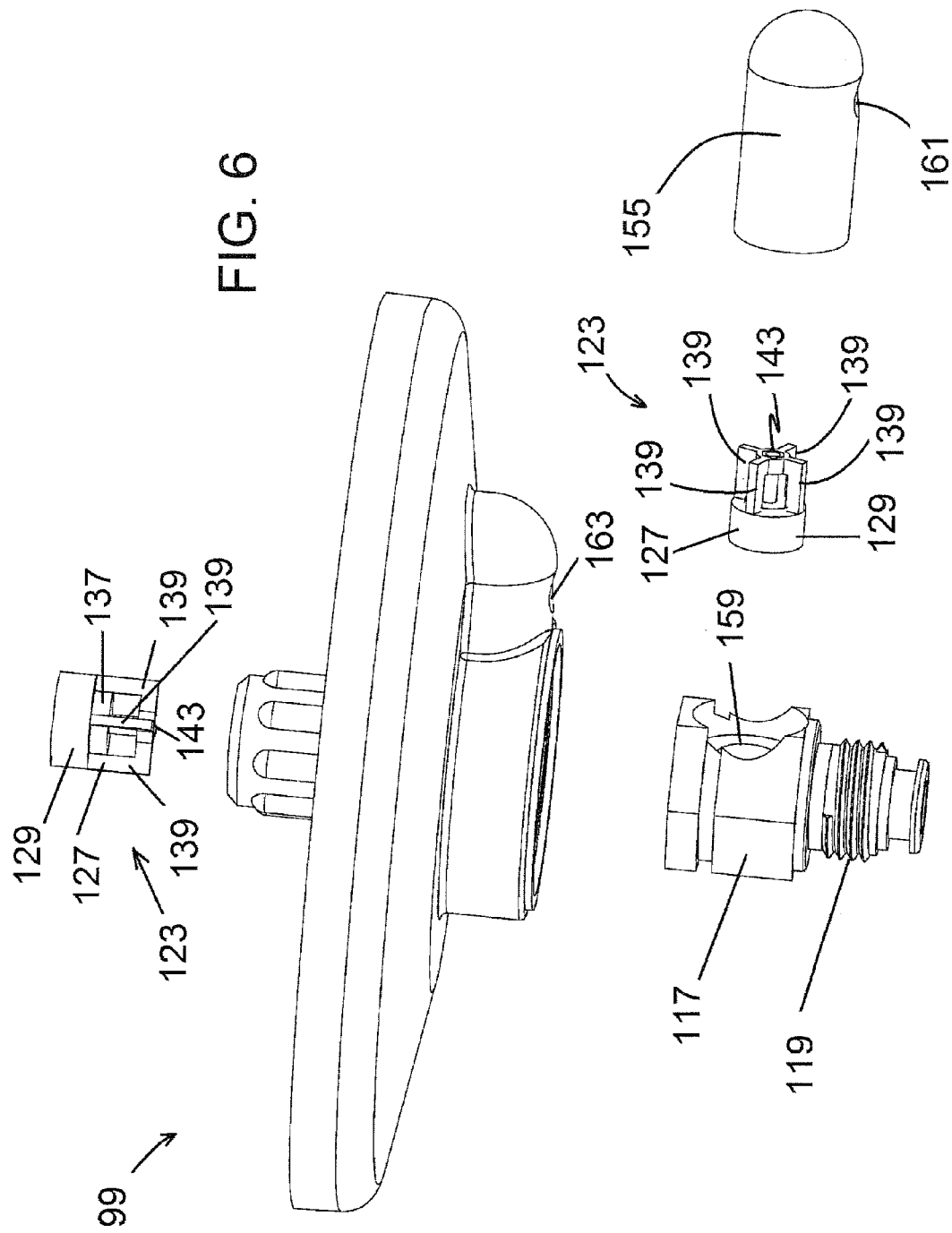
FIG. 6 is an exploded view of the inventive first end cap.

Referring to FIG. 5, a first valve 123 is positioned in the first passageway 111 of the first end cap 99 for blocking water backflowing into the first passageway 111 from the outlet port 79 from moving past the first valve 123 to the outlet side 217 of the matrix 95 (FIG. 1) when the first valve 123 is closed.

The first valve 123 is positioned against an annular ledge 125 formed in the first passageway 111 of the first end cap 99. Preferably, the first valve 123 is a spring-loaded check valve (hereinafter referenced to as "first check valve 123" or "valve 123"), and preferably first check valve 123 includes a valve housing 127 (preferably made of a suitable polymeric material) having an annular ring-shaped base portion 129 that has an annular inner wall surface 131. An annular ledge 133 is formed on the inner wall surface 131 creating a valve seat 135. Preferably, a groove (not shown) is formed in the outer wall surface of the base portion 129 of the valve housing 127 and extends around the base portion 129, and an o-ring (not shown) is positioned in and extends partially from the groove to facilitate the formation of a seal between the valve housing 127 and a portion of the surface of the first end cap 99 that defines the first passageway 111.

Preferably, the first check valve 123 also includes a movable valve disk 137 (preferably made of a suitable polymeric material) that is contained within the valve housing 127 and closes the first check valve 123 when the valve disk 137 rests against the valve seat 135 and that permits flow of water through the first check valve 123 when the valve disk 137 is not resting against the valve seat 135. The valve housing 127 preferably also includes a plurality of arms 139 that extend away from the base portion 129 of the valve housing 127 and over the opening in the valve housing 127 formed by the annular ring-shaped base portion 129 to form a cage-like structure that contains the valve disk 135 in the valve housing 127. Preferably, the valve disk 137 has a guide pin 141 formed on and extending upstream from its upstream face that is engaged by and slides in a guide pin holder 143 (a small hollow cylinder) formed on the ends of the arms 139 where the arms 139 meet over the opening in the annular ring-shaped base portion 129 to keep motion of the valve disk 137 on a line that permits proper seating of the valve disk 137 on the valve seat 135. A spring 145 is provided in valve 123 to bias the valve 123 in a closed position. That is, the spring 145 is provided in valve 123 to bias the valve disk 137 against the valve seat 135.

The first end cap 99 also is provided with a second passageway 147 that extends from the first passageway 111 of the first end cap 99 downstream of the first valve 123 to a port 149 for the second passageway 147. The port 149 opens the second passageway 147 of the first end cap 99 to outside of the first end cap 99 to a portion of a first passageway 151 of the apparatus 11 that extends from the inlet port 55 to the inlet side 153 of the matrix 95. Preferably, the second passageway 147 is formed by a bullet-shaped hollow capsule 155 (which preferably is made from Celcon acetal copolymers), which has a first open end 157 aligned with an opening 159 in the tube 117 that leads to a portion of the first passageway 111 extending through the tube 117, and which has an opening 161 that forms a portion of the port 149, the port 149 being formed by the combination of the opening 161 in the capsule 155 and a hole 163 that is aligned with and connects to the opening 161.

A second valve 165 is positioned in the second passageway 147 of the first end cap 99 for blocking flow of water into the first passageway 111 of the first end cap 99 from the second passageway 147 when the second valve 165 is closed.

Preferably, the second valve 165 is a spring-loaded check valve (hereinafter referenced to as "second check valve 165" or "valve 165"), and preferably second check valve 165 has the same structure as the first check valve 123 and includes a valve housing 127 (preferably made of a suitable polymeric material) having an annular ring-shaped base portion 129 that has an annular inner wall surface 131. An annular ledge 133 is formed on the inner wall surface 131 creating a valve seat 135. Preferably, a groove (not shown) is formed in the outer wall surface of the base portion 129 of the valve housing 127 and extends around the base portion 129, and an o-ring (not shown) is positioned in and extends partially from the groove to facilitate the formation of a seal between the valve housing 127 and a portion of the surface of the capsule 155 that defines the second passageway 147.

Preferably, the second check valve 165 also includes a movable valve disk 137 (preferably made of a suitable polymeric material) that is contained within the valve housing 127 and closes the second check valve 165 when the valve disk 137 rests against the valve seat 135. The valve housing 127 preferably also includes a plurality of arms 139 that extend away from the base portion 129 of the valve housing 127 and over the opening in the valve housing 127 formed by the annular ring-shaped base portion 129 to form a cage-like structure that contains the valve disk 135 in the valve housing 127. Preferably, the valve disk 137 has a guide pin 141 formed on and extending away from the valve disk 137 that is engaged by and slides in a guide pin holder 143 (a small hollow cylinder) formed on the ends of the arms 139 where the arms 139 meet over the opening in the annular ring-shaped base portion 129 to keep motion of the valve disk 137 on a line that permits proper seating of the valve disk 137 on the valve seat 135. A spring 145 is provided in valve 123 to bias the valve 123 in a closed position. That is, the spring 145 is provided in valve 123 to bias the valve disk 137 against the valve seat 135.

The second valve 165 is maintained in place in the second passageway 147 of the first end cap 99 by being positioned therein such that the base portion 129 of the valve housing 127 abuts against a portion of the tube 117 defining the opening 159 and the other end of the valve housing 127 abuts against an annular ledge or shelf 167 formed in the capsule 155.

The first end cap 99 preferably is manufactured using a molding process, in which the second valve 165 is placed in the capsule 155 by sliding the second valve 165 into the capsule 155 through the first open end 157 of the capsule, the capsule 155 (with the second valve 165 positioned therein) is inserted into the opening 159 in the tube 117 to abut against a portion of the tube 117 defining the opening 159 therein, and then the tube 117 with the capsule 155 inserted therein is placed in a mold and the remainder of the first end cap 99 is molded around the tube 117 and the capsule 155 using a polymeric material. Preferably, the tube 117 is provided with a recess 169 machined therein into which is formed a portion 171 of the remainder of the first end cap 99, thereby aiding in keeping the tube 117 from spinning in the first end cap 99 and in alignment with capsule 155. Next, the first valve 123 is slid into the first end portion 113 of the first passageway 111 of the first end cap 99 and up against the annular ledge 125 formed along the first passageway 111. With the first valve 123 positioned in the first passageway 111, an ultrasonic welder is used to fold over a small portion of the first end cap 99 surrounding the opening to the first passageway 111 at the first end portion 113 of the first passageway 111 to block the first valve 123 from falling out of the first passageway 111, while at the same time substantially keeping the opening to the first passageway 111 unimpeded by the small portion of the first end cap 99 that is folded over by the ultrasonic welder.

Before the cartridge 15 is screwed into the outlet port member 81, an annular rubber washer or gasket 173 is positioned around a portion of the tube 117, and the annular rubber washer or gasket 173 is sandwiched between a portion of the first end cap 99 and both the second end portion 83 of the outlet port member 81 and the second nut 85 to form a seal therebetween when the cartridge 15 is screwed into the outlet port member 81.

Figure 7:
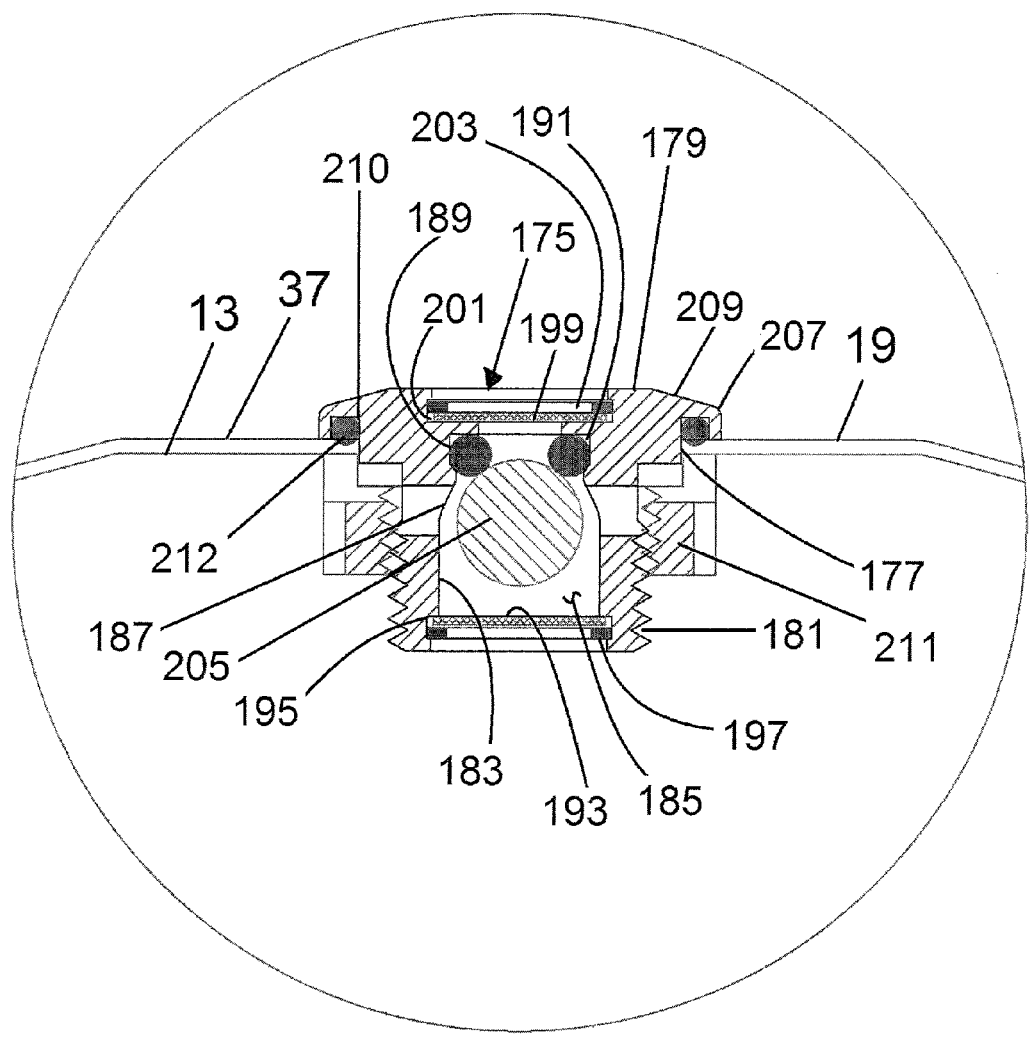
FIG. 7 is a view in cross-section showing an automatic venting device, constructed in accordance with the invention, mounted on the bottom wall of the bowl of the housing of the apparatus of the invention.

The apparatus 11 preferably is provided with an automatic venting device 175 for venting and breaking any unwanted vacuum. As shown in FIG. 7, the automatic venting device 175 is positioned in an opening 177 in the bottom wall 37 of the bowl 19. The automatic venting device 175 includes a hollow bolt-like member 179 that has a threaded exterior portion 181 extending through the opening 177 into the housing 13. The member 179 of the automatic venting device 175 has a cylindrical interior wall 183 forming a passageway 185 extending through the member 179 along its central axis, and the cylindrical wall 183 has an inwardly extending ledge 187. A sealing member 189, such as an o-ring or x-ring or quad seal, is positioned in an annular groove 191 formed in the cylindrical interior wall 183 adjacent to the ledge 187. A screen 193, positioned in an annular recess 195 formed in the cylindrical interior wall 183 and held in place with a snap ring 197, and a screen 199, positioned in an annular recess 201 formed in the cylindrical interior wall 183 and held in place by a snap ring 203 are provided to reject possible interfering debris or particulates. A ball 205 preferably having a density less than the density of water (e.g., a preferred specific gravity for the ball 205 is about 0.97) is positioned in the passageway 185 between the sealing member 189 and the screen 193 and permits venting of air and breaking of any unwanted vacuum until water in the housing 13 pushes the ball 205 into engagement with the sealing member 189 creating a seal between the ball 205 and the sealing member 189 and the sealing member 189 and the cylindrical interior wall 183, thereby closing the passageway 185.

As shown best in FIG. 7, the member 179 has a flange 207 extending radially outwardly at its top end portion 209, and an annular groove 210 is formed therein that receives an o-ring 212 to seal between the bottom wall 37 of the bowl 19 and the flange 207 when the threaded exterior portion 181 of the member 179 has been extended through the opening 177 in the bottom wall 37 of the bowl 19 and a nut 211 has been threaded onto the threaded exterior portion 181 of the member 179 to mount the automatic venting device in place on the bowl 19.

As shown in FIG. 1, a mounting bracket 213 is provided for mounting the apparatus 11 in place where it is desired to be used. The mounting bracket 213 preferably is mounted onto the housing 13 by a band clamp or by welding. The mounting bracket is provided with holes 214 extending therethrough that receive screws, threaded bolts, or the like for mounting the bracket 213 to the place where it is desired to use the apparatus 11.

Overall, the apparatus 11 has the first passageway 151 that extends from the inlet port 55 to the inlet side 153 of the matrix 95, a second passageway 215 that extends from the outlet side 217 of the matrix 95 to the outlet port 79 of the housing 13 and includes the second passageway 215 of the first end cap 99, and a third passageway 219 that extends from the first passageway 151 (and specifically from the first passageway 111 of the first end cap 99) of the apparatus 11 through the bullet-shaped hollow capsule 155 positioned in the first end cap 99 to a portion of the first passageway 151 of the apparatus 11 through the port 149 (the third passageway 219 of the apparatus 11 being the same as the second passageway 147 of the first end cap 99).

In operation, water to be filtered and/or purified flows into the first passageway 151 of the apparatus 11 through the inlet port 55, and then moves along the first passageway 151 of the apparatus 11 to the inlet side 153 of the matrix 95, and then through the matrix 95 to second passageway 215 of the apparatus 11, the second passageway 215 of the apparatus 11 beginning in the channel 97 in the matrix 95. Next, the water flows further along the second passageway 215 of the apparatus 11, moving from the channel 97 into and through the first passageway 111 formed in the first end cap 99, and exits the apparatus 11 from the outlet port 79 of the apparatus 11. As the water enters the first passageway 111 of the first end cap 95, the water pushes the movable disk 137 of the first check valve 123 off the valve seat 135 of the first check valve 123 and moves it in a downstream direction away from the valve seat 135 of the first valve 123 to permit the water to flow through the first valve 123 and through the first passageway 111 of the first end cap 99 to a fluid receiving line connected to the outlet port 79.

Water that enters the capsule 155 through the port 149 pushes the movable disk 33 of the second check valve 165 into contact against the valve seat 31 of the second check valve 165 to close the second cheek valve 165, thereby preventing water from moving from the capsule 155 past the second check valve 165 and into the first passageway 111 of the first end cap 99.

Backflow of water into the first passageway 111 of the first end cap 99 from the outlet port 79 is blocked by the first valve 123 from moving from the first passageway 111 into the channel 97 (the outlet side 217 of the matrix 95) since such backflow pushes the valve disk 137 of the first check valve 123 against the valve seat 135 of the first check valve 123 to close the first check valve 123.

If water boiler expansion pressure builds up to a dangerous level due to a water boiler provided along the water distribution lines downstream of our apparatus 11 overheating, our invention provides water boiler expansion pressure relief by permitting the water boiler expansion pressure to be directed backwards along the water transmission lines and back towards the water supply source (e.g., a water supply tank). Such water boiler expansion pressure moving into the first passageway 111 of the first end cap 99 via the outlet port 79, and in combination with the spring 145 of the first check valve 123, pushes the movable disk 137 of the first check valve 123 onto the valve seat 135 of the first check valve 123, thereby causing the first check valve 123 to close preventing the water boiler expansion pressure from moving past the first check valve 123 and into contact with the cartridge 15. However, such water boiler expansion pressure pushes the movable disk 137 of the second check valve 165 away from the valve seat 135 of the second check valve 165 thereby opening the second check valve 165, permitting the water boiler expansion pressure to move past the second check valve 165 and into the first passageway 151 of the apparatus 11 on the inlet side 153 of the matrix 95 via the port 149, then into the water transmission line via the inlet port 55 at the entrance to the first passageway 151 of the apparatus 11, and then back along the water transmission line upstream of the apparatus 11 toward the water supply source (e.g., a water supply tank) of the water distribution system. Such dangerous level water boiler expansion pressure overcomes the force placed on the disk 137 of the second check valve 165 by water in the capsule 155, and the force placed on the disk 137 of the second check valve 165 by the spring 145 of the second check valve 165, permitting the water boiler expansion pressure to move through the apparatus 11 from the outlet port 79 to the first passageway 111 of the first end cap 99, then from the first passageway 111 to the second passageway 147 of the first end cap 99, then from the second passageway 147 of the first end cap 99 to the first passageway 151 of the apparatus 11, and then from the first passageway 151 of the apparatus 11 to and through the inlet port 55 into the water transmission line upstream of the apparatus 11 back towards the water supply source.

The inventive apparatus 11 provides for water boiler expansion pressure relief by permitting the water boiler expansion pressure to be directed backwards along the water transmission lines past the apparatus 11 and back towards the water supply source (e.g., a water supply tank) without being blocked by the apparatus 11, and without causing water to backflow into the outlet side 217 of the matrix 95 (the channel 97), thereby preventing any water contaminated from biofilm formed on the transmission lines downstream of the apparatus 11 from backflowing into the outlet side 217 of the matrix 95 (the channel 97) and contaminating the filtered and/or purified side of the matrix 97 and thereby cause the water exiting the outlet port 79 of the apparatus 11 to be contaminated.

The invention claimed is:

1. An apparatus for filtering and/or purifying water flowing through a water distribution system, comprising
 a housing, the housing having an inlet port and an outlet port, and
 a cartridge positioned in the housing for filtering and/or purifying water, the cartridge including a medium for filtering and/or purifying water passing through the medium from an inlet side of the medium to an outlet side of the medium, an end cap, the end cap engaging the medium with means for engaging the medium, the end cap having a first passageway extending through the end cap, the first passageway having a first end portion and a second end portion, the first passageway having an outlet port formed at the second end portion of the first passageway adapted to be connected to and be in fluid communication with the outlet port of the housing containing the cartridge, a first valve positioned in the first passageway of the end cap for blocking water backflowing into the first passageway of the end cap from moving past the first valve to the outlet side of the medium, the end cap having a second passageway extending from the first passageway of the end cap downstream of the first valve to a port for the second passageway, the port for the second passageway opening the second passageway to outside of the end cap to a passageway inside the housing upstream of the inlet side of the medium for filtering and/or purifying water, and second valve positioned in the second passageway of the end cap for blocking flow of water into the first passageway of the end cap from the second passageway of the end cap and for permitting water boiler expansion pressure to move from the first passageway of the end cap into the second passageway of the end cap, the inlet port of the housing being adapted to be connected to and placed in fluid communication with a water line of the water distribution system for transmitting water to be filtered and/or purified in the housing to the housing, the outlet port being adapted to be connected to and placed in fluid communication with a water line of the water distribution system for receiving water that has been filtered and/or purified by the media for filtering and/or purifying water, and the passageway inside the housing upstream of the inlet side of the medium for filtering and/or purifying water extending from the inlet port of the housing to the medium for filtering and/or purifying water, wherein water boiler expansion pressure relief is provided by permitting water boiler expansion pressure to move through the apparatus from the outlet port of the housing to the first passageway of the end cap, then from the first passageway of the end cap to the second passageway of the end cap, then from the second passageway of the end cap to the passageway inside the housing upstream of the inlet side of the medium for filtering and/or purifying water, and then from the passageway inside the housing upstream of the inlet side of the medium for filtering and/or purifying water to and through the inlet port of the housing into the water line of the water distribution system upstream of the apparatus back towards a water supply source of the water distribution system, without causing water to backflow into the outlet side of the medium for filtering and/or purifying water, thereby preventing any water contaminated from biofilm formed on water lines of the water distribution system downstream of the apparatus from backflowing into the outlet side of the medium for filtering and/or purifying water and contaminating the outlet side of the medium for filtering and/or purifying water and thereby cause water exiting the outlet port of the housing to be contaminated.

2. The apparatus of claim 1,
the first valve being a check valve.

3. The apparatus of claim 1,
the second valve being a check valve.

4. The apparatus of claim 1,
the first valve including
a valve housing, the valve housing having an annular ring having an annular inner wall surface, the annular inner wall surface having an annular ledge formed thereon creating a valve seat, and
a movable valve disk contained in the housing that closes the first valve when the valve disk rests against the valve seat and that permits flow of water through the first valve when the valve disk is not resting against the valve seat, the valve disk having a guide pin formed on and extending downstream from its downstream face that is engaged by and slides in a guide pin holder to keep motion of the valve disk on a line that permits proper seating of the valve disk on the valve seat when the first valve is closed, the guide pin holder being positioned downstream of the annular ring of the first valve.

5. The apparatus of claim 1,
the second valve including
a valve housing, the valve housing having an annular ring having an annular inner wall surface, the annular inner wall surface having an annular ledge formed thereon creating a valve seat, and
a movable valve disk contained in the housing that closes the second valve when the valve disk rests against the valve seat, the valve disk having a guide pin formed on and extending downstream from its downstream face that is engaged by and slides in a guide pin holder to keep motion of the valve disk on a line that permits proper seating of the valve disk on the valve seat when the second valve is closed, the second valve being oriented in the third passageway of the apparatus such that valve disk of the second valve is oriented to be pushed away from the valve seat of the second valve by water boiler expansion pressure received in the third passageway of the apparatus from the second passageway of the apparatus to open the second valve.

6. A cartridge for filtering and/or purifying water flowing through a water distribution system, the cartridge being adapted to be positioned in a housing having an inlet port and an outlet port, the cartridge comprising
a medium for filtering and/or purifying water passing through it from an inlet side of the medium to an outlet side of the medium,
an end cap,
the end cap engaging the medium with means for engaging the medium,
the end cap having a first passageway extending through the end cap, the first passageway having a first end portion and a second end portion,
the first passageway having an outlet port formed at the second end portion of the first passageway adapted to be connected to and be in fluid communication with the outlet port of the housing containing the cartridge when the cartridge is positioned inside a housing,
a first valve positioned in the first passageway of the end cap for blocking water backflowing into the first passageway of the end cap from moving past the first valve to the outlet side of the medium,
the end cap having a second passageway extending from the first passageway of the end cap downstream of the first valve to a port for the second passageway, the port for the second passageway opening the second passageway to outside of the end cap to a passageway inside the housing, when the cartridge is positioned inside a housing, upstream of the inlet side of the medium, and second valve positioned in the second passageway of the end cap for blocking flow of water into the first passageway of the end cap from the second passageway of the end cap and for permitting water boiler expansion pressure to move from the first passageway of the end cap into the second passageway of the end cap.

7. The cartridge of claim 6,
the first valve being a check valve, and the second valve being a check valve.

8. An end cap of a cartridge for filtering and/or purifying water flowing through a water distribution system, the cartridge having a medium for filtering and/or purifying water passing through the medium from an inlet side of the medium to an outlet side of the medium, the end cap comprising a body,
the body having means for engaging the medium,
the body having a first passageway extending through the body,
the first passageway having a first end portion and a second end portion,
the first passageway having an outlet port formed at the second end portion of the first passageway adapted to be connected to and be in fluid communication with an outlet port of a housing when the cartridge is positioned in a housing,
a first valve positioned in the first passageway of the body for blocking water backflowing into the first passageway of the body from moving past the first valve to the outlet side of the medium when the medium is engaged by the body,
the body having a second passageway extending from the first passageway of the body downstream of the first valve to a port for the second passageway, the port for the second passageway opening the second passageway to outside of the body to a passageway inside a housing, when the cartridge is positioned inside a housing, upstream of the inlet side of the medium, and
second valve means positioned in the second passageway of the body for blocking flow of water into the first passageway of the body from the second passageway of the body and for permitting water boiler expansion pressure to move from the first passageway of the body into the second passageway of the body.

9. The end cap of claim 8,
the first valve being a check valve, and the second valve being a check valve.

10. The end cap of claim 8,
the first passageway being formed by a hollow tube,
the second passageway being formed by a hollow capsule having a first open end aligned and in fluid communication with an opening to the first passageway, said opening being downstream of the first valve,
the hollow capsule further having an opening that is aligned and in fluid communication with a hole extending from the opening in the capsule and through the body, the opening and the hole forming the port for the second passageway,
the second valve being positioned in the hollow capsule, and
the hollow tube and the hollow capsule, with the open end of the hollow capsule being aligned and in fluid communication with the opening to the first passageway, and with the second valve being positioned in the hollow capsule, having polymeric material molded therearound forming the end cap.

\* \* \* \* \*